Sept. 15, 1959  F. E. GREER  2,903,814
BAIT BOX
Filed Sept. 27, 1957

INVENTOR.
Frank E. Greer
BY
Papp and Sommer
Attorneys.

United States Patent Office 2,903,814
Patented Sept. 15, 1959

2,903,814
BAIT BOX

Frank E. Greer, North Tonawanda, N.Y.

Application September 27, 1957, Serial No. 686,684

3 Claims. (Cl. 43—55)

This invention relates to bait boxes, and more particularly to a box for bait of the type that characteristically moves toward the bottom of the bedding in a bait box.

Worms, of the common garden variety, have long been used by fishermen as an excellent form of bait. However, worms in general have an annoying habit of seeking the bottom of the bait box, much to the inconvenience of the fisherman when he seeks to select one for baiting a hook.

Bait boxes have been designed to take advantage of the bottom seeking habit of worms, such boxes often using oppositely opening covers whereby the bait user may always open whichever cover is at the bottom. The bait box of the present invention includes new and novel features representing an improvement in such type bait boxes. Among such features characterizing the present invention is the provision of a closure means for automatically closing and maintaining the covers in closed position.

The main object of this invention is to provide a bait box for bait of the type that characteristically moves toward the bottom of the bedding in the bait box.

A further object of this invention is to provide a bait box having oppositely disposed covers.

Still another object of this invention is to provide a bait box having a closure means for automatically closing and maintaining the covers in closed position.

These and further objects and features of the invention will become more apparent from the following description and accompanying drawing wherein.

Figure 2:
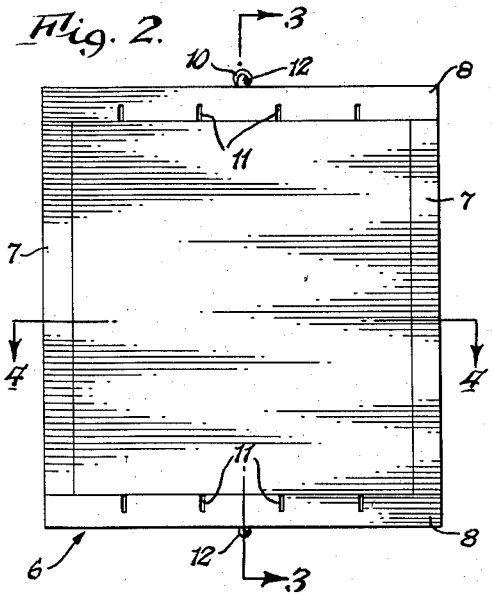
Fig. 2 is a side view of same.
Figure 3:
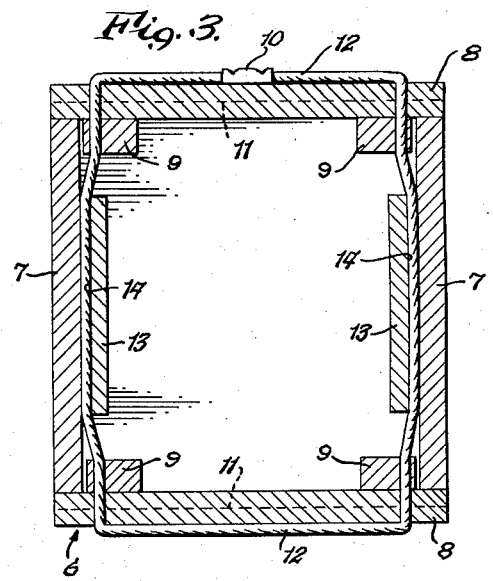
Fig. 3 is a section view as seen from line 3—3 in Fig. 2.
Figure 1:
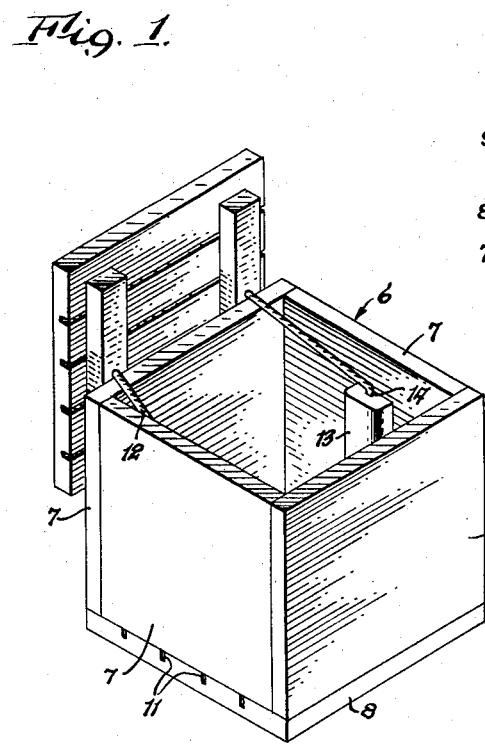
Fig. 1 is a perspective view of a bait box illustrative of an embodiment of the invention.
Figure 4:
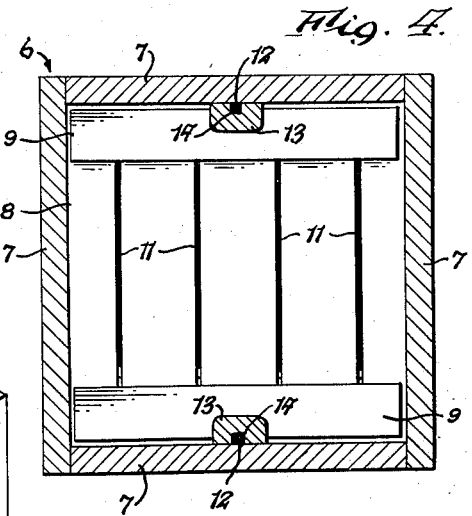
Fig. 4 is a section view as seen from line 4—4 in Fig. 2.

Referring now to the drawing, the numeral 6 identifies a generally square shaped bait box, preferably formed of wood, and having side walls 7 which are fixed together by conventional means, such as nailing, dovetailing, and/or gluing. A pair of covers 8 are adapted for enclosing the opposite end openings of the box, said covers interchangeably serving as top and bottom covers, depending upon the position of the box. The external dimensions of the covers 8, coincide with the external dimensions of the assembled side walls 7. Each cover 8 has a positioning means in the form of parallel arranged wood bars 9, which are secured to the bottom, or inside surface of each cover. The bars 9 are of such dimension and are so arranged as to position a cover 8 squarely upon an opening when it is seated thereupon. A plurality of parallel arranged slots 11 are formed in the bottom, or inside surface of each cover, to provide ventilating means for the box interior. A cover closing means in the form of an elastic cord 12, is arranged to interconnect the covers by passing through both covers 8 and have the ends exteriorly clamped on one cover by a clip 10, as best seen in Fig. 3. The cord 12 is guidingly maintained within the box by means of a pair of wood bars 13, each of which is secured to an opposite side wall 7. Each bar 13 has a groove 14 adapted to snugly maintain the cord 12 against the inner surface of the side wall to which a bar 13 is affixed. The cord 12 is arranged to be in tension when the covers 8 are in closed position upon the box so that when a cover is opened and released, the cord will automatically pull the cover to seated position, and will continue to maintain the cover in seated position. While a single continuous cord is used, it may be desired to use a separate cord for each cover; however, the use of a single continuous cord is believed to provide the simplest and least expensive arrangement.

It will be seen from the foregoing description, that the box of the invention will provide a convenient box for bottom seeking bait, such as worms, wherein the cover at the bottom side may be used when opened for removing bait. In addition, the closure means in the form of cord 12, assures automatic seating of both box covers, and the maintenance of each cover in seated position.

The foregoing description has been given in detail without thought of limitation since the inventive principles involved are capable of assuming other physical embodiments without departing from the spirit of the invention and the scope of the appended claims.

What is claimed is:

1. A bait box comprising four rectangular side walls joined along their vertical edges to provide a rectangular tubular body open at its upper and lower ends, a rectangular wooden cover fitting the open upper end of said body and removable directly upwardly away from all of said side walls, bars fast to the under side of said cover and positioned with their ends and sides close to said side walls in the seated position of said cover, a rectangular wooden bottom fitting the open lower end of said body and removable directly downwardly away from all of said side walls, bars secured to the upper side of said bottom and positioned with their ends and sides close to said side walls in the seated position of said bottom, a pair of elastic cords severally connecting the opposite sides of said cover with corresponding opposite sides of said bottom and being positioned adjacent to corresponding opposite side walls of said body, said cords being under tension for drawing said cover and bottom together and maintaining them in seated condition, and guide means for each of said cords mounted on the inner faces of said corresponding opposite side walls of said body and embracing said cords to retain them against lateral displacement.

2. A bait box comprising side walls joined to provide a tubular body open at its upper and lower ends, a cover fitting the open upper end of said body and removable directly upwardly away from all of said side walls, a bottom fitting the open lower end of said side walls and thence movable directly downwardly away from all of said side walls, a pair of elastic cords severally connecting opposite sides of said cover, with corresponding opposite sides of said bottom and being mounted so as to be adjacent to corresponding opposite side walls of said body, and cord guide means mounted on the insides of said corresponding opposite side walls of said body and embracing said cords to retain them against lateral displacement, said cords being under tension for drawing said cover and bottom together and maintaining them in seated condition.

3. A bait box comprising side walls joined to provide a tubular body open at its upper and lower ends, a cover fitting the open upper end of said body and removable directly upwardly away from all of said side walls, a bottom fitting the open lower end of said side walls and thence movable in any direction, a pair of elastic cords severally connecting opposite sides of said cover, with corresponding opposite sides of said bottom and being mounted so as to be adjacent to corresponding opposite side walls of said body, and a vertical channel member fixed to the inner face of each of said opposite walls of said body with its channel opposing the wall to which it is secured and containing the corresponding cord, said cords being under tension for drawing said cover and bottom together and maintaining them in seated condition.

References Cited in the file of this patent

UNITED STATES PATENTS

| | | |
|---|---|---|
| 356,524 | Clement | Jan. 25, 1887 |
| 2,347,021 | Auerbach | Apr. 18, 1944 |
| 2,620,588 | Critser | Dec. 9, 1952 |
| 2,630,651 | McGee | Mar. 10, 1953 |
| 2,780,887 | Cabaniss | Feb. 12, 1957 |

FOREIGN PATENTS

| | | |
|---|---|---|
| 2,646 | Switzerland | Sept. 6, 1890 |
| 603,388 | Great Britain | 1948 |